(12) United States Patent
Kueckendahl et al.

(10) Patent No.: US 9,013,753 B2
(45) Date of Patent: Apr. 21, 2015

(54) APPARATUS FOR PRINTING A DIGITAL IMAGE ON AN OBJECT, APPARATUS FOR SCANNING AN OBJECT TO CREATE A DIGITAL IMAGE, AND RELATED METHODS OF CONTROLLING SUCH APPARATUSES

(75) Inventors: Peter Joerg Kueckendahl, Bad Oldesloe (DE); Daniel Joseph Ryan, Sycamore, IL (US)

(73) Assignee: Alltec Angewandte Laserlicht Technologie GmbH, Selmsdorf (DE)

( * ) Notice: Subject to any disclaimer, the term of this patent is extended or adjusted under 35 U.S.C. 154(b) by 0 days.

(21) Appl. No.: 13/976,793
(22) PCT Filed: Dec. 22, 2011
(86) PCT No.: PCT/EP2011/006519
§ 371 (c)(1), (2), (4) Date: Jun. 27, 2013
(87) PCT Pub. No.: WO2012/089324
PCT Pub. Date: Jul. 5, 2012

(65) Prior Publication Data
US 2013/0278950 A1 Oct. 24, 2013

(30) Foreign Application Priority Data
Dec. 30, 2010 (EP) ..................................... 10016194

(51) Int. Cl.
*G06F 15/00* (2006.01)
*G06K 1/00* (2006.01)
(Continued)

(52) U.S. Cl.
CPC ............... *H04N 1/195* (2013.01); *H04N 1/193* (2013.01); *H04N 1/1932* (2013.01)

(58) Field of Classification Search
None
See application file for complete search history.

(56) References Cited

U.S. PATENT DOCUMENTS 4,707,063 A 11/1987 Plummer
(Continued)

FOREIGN PATENT DOCUMENTS

DE 2401322 1/1974
(Continued)

OTHER PUBLICATIONS

International Application No. PCT/EP2011/006519, Written Opinion of International Search Authority.
(Continued)

*Primary Examiner* — Ming Hon
(74) *Attorney, Agent, or Firm* — Hoffman Warnick LLC

(57) ABSTRACT

The invention relates to a method for controlling an apparatus, in particular a marking apparatus and/or a scanning apparatus, for printing a digital image on an object and/or scanning an object to create a digital image of the object, wherein the digital image comprises pixels arranged in image columns and image rows, wherein the apparatus comprises an operating head having a plurality of operating devices, in particular marking devices and/or sensing devices, wherein the object is moved relative to the operating head in an advance direction, in which the pixel values are transferred between the operating devices and an image storage comprising storing elements arranged in storage columns and storage rows for storing pixel values, particularly in which the operating devices are time dependently supplied with pixel values of the digital image from the image storage, and/or pixel values sensed by the operating devices are transferred to the image storage to form the digital image. The inventive method is characterized in that the operating devices are arranged in an array of array rows and array columns, such that a rectangular pattern of the operating devices is formed, the array of operating devices is tilted by a tilting angle with regard to the advance direction, and the operating devices are controlled according to a mapping algorithm that defines between which operating device and which storing element of the image storage a pixel value is transferred based on the tilting angle. The invention further relates to an apparatus for printing and/or scanning, to a computer program, and a computer program product.

15 Claims, 3 Drawing Sheets

(51) Int. Cl.
  *G06K 15/00* (2006.01)
  *H04N 1/195* (2006.01)
  *H04N 1/193* (2006.01)

(56) References Cited

U.S. PATENT DOCUMENTS

| | | | |
|---|---|---|---|
| 5,399,032 | A | 3/1995 | Itoh et al. |
| 5,477,259 | A | 12/1995 | Iwasa |
| 5,777,634 | A | 7/1998 | Okamura et al. |
| 5,784,098 | A | 7/1998 | Shoji et al. |
| 6,189,991 | B1 | 2/2001 | Wen et al. |
| 6,286,927 | B1 | 9/2001 | Taneya et al. |
| 6,381,377 | B1* | 4/2002 | Wang ............................ 382/299 |
| 6,469,729 | B1 | 10/2002 | Ryan |
| 6,738,086 | B2 | 5/2004 | Oka |
| 6,855,921 | B1 | 2/2005 | Stopperan et al. |
| 7,354,130 | B2 | 4/2008 | Arakawa |
| 7,448,719 | B1 | 11/2008 | Newell |
| 7,564,020 | B2 | 7/2009 | Sergyeyenko |
| 7,671,337 | B1 | 3/2010 | Tidwell |
| 7,908,968 | B2 | 3/2011 | McCoin et al. |
| 2002/0001004 | A1* | 1/2002 | Mantell et al. .................. 347/15 |
| 2002/0101469 | A1 | 8/2002 | Wade et al. |
| 2002/0139273 | A1 | 10/2002 | Murata et al. |
| 2002/0191069 | A1 | 12/2002 | Oka |
| 2003/0016348 | A1 | 1/2003 | Sallee |
| 2003/0210861 | A1 | 11/2003 | Weiss et al. |
| 2003/0235373 | A1 | 12/2003 | Ishii et al. |
| 2004/0160478 | A1 | 8/2004 | Weijkamp et al. |
| 2005/0122548 | A1 | 6/2005 | Cunnigan et al. |
| 2005/0123303 | A1 | 6/2005 | Guttman et al. |
| 2005/0140770 | A1 | 6/2005 | Kang et al. |
| 2005/0286093 | A1 | 12/2005 | Sumi et al. |
| 2006/0066924 | A1 | 3/2006 | Delueg |
| 2006/0109525 | A1* | 5/2006 | Evans ............................ 358/483 |
| 2007/0091132 | A1 | 4/2007 | Lim |
| 2007/0279713 | A1 | 12/2007 | Feng et al. |
| 2008/0055352 | A1 | 3/2008 | Toh et al. |
| 2008/0246962 | A1 | 10/2008 | Yang |
| 2010/0002057 | A1 | 1/2010 | Hatasa et al. |
| 2010/0214387 | A1 | 8/2010 | Fox et al. |
| 2010/0231929 | A1* | 9/2010 | Kakigi ............................ 358/1.2 |
| 2013/0021398 | A1* | 1/2013 | Mizes et al. .................... 347/14 |
| 2013/0286147 | A1 | 10/2013 | Kueckendahl et al. |
| 2013/0286148 | A1 | 10/2013 | Kueckendahl et al. |
| 2013/0286149 | A1 | 10/2013 | Kueckendahl et al. |
| 2013/0293658 | A1 | 11/2013 | Kueckendahl et al. |
| 2013/0328978 | A1 | 12/2013 | Sekino et al. |
| 2013/0342823 | A1 | 12/2013 | Kueckendahl et al. |

FOREIGN PATENT DOCUMENTS

| | | | |
|---|---|---|---|
| DE | 3826113 | A1 | 2/1989 |
| EP | 0121369 | A2 | 10/1984 |
| EP | 0832754 | B1 | 12/1993 |
| EP | 0832752 | A2 | 4/1998 |
| EP | 1266763 | A1 | 12/2002 |
| EP | 1640169 | A3 | 9/2005 |
| EP | 1640169 | A2 | 3/2006 |
| EP | 1640169 | A3 | 10/2007 |
| EP | 2105309 | A1 | 9/2009 |
| JP | 59136267 | | 8/1984 |
| JP | 05185686 | | 7/1993 |
| JP | 2001332806 | A | 11/2001 |
| JP | 2007090814 | A | 4/2007 |
| JP | 2008126471 | A | 6/2008 |
| JP | 2009037128 | A | 2/2009 |
| WO | 8505187 | A1 | 11/1985 |
| WO | 2006037973 | A1 | 4/2006 |
| WO | 2007107030 | A1 | 9/2007 |
| WO | 2008104222 | A1 | 9/2008 |
| WO | 2009153795 | A1 | 12/2009 |

OTHER PUBLICATIONS

International Application No. PCT/EP2011/006519, Preliminary Report on Patentability.
International Application No. PCT/EP2011/006517, Written Opinion of International Search Authority.
International Application No. PCT/EP2011/00652023, Written Opinion of International Search Authority.
U.S. Appl. No. 13/976,779, Office Action dated Jun. 16, 2014.
U.S. Appl. No. 13/976,804, Notice of Allowance dated Mar. 20, 2014.
U.S. Appl. No. 13/976,809, Office Action dated May 27, 2014.
U.S. Appl. No. 13/977,159, Office Action dated Jun. 20, 2014.
U.S. Appl. No. 13/976,832, Notice of Allowance and Fees Due dated Jun. 24, 2014.
International Application No. PCT/EP2011/006516, International Search Report, dated Mar. 23, 2012, 3 pages.
International Application No. PCT/EP2011/006521, Written Opinion of International Search Authority.
International Application No. PCT/EP2011/006521, Written Opinion of International Examining Authority.
U.S. Appl. No. 13/976,804, Office Action dated Jul. 8, 2014.
U.S. Appl. No. 13/977,151, Notice of Allowance and Fees Due dated Aug. 4, 2014.
U.S. Appl. No. 13/977,156, Office Action dated Jul. 9, 2014.
International Application No. PCT/EP2011/006520, Written Opinion of International Search Authority.
International Application No. PCT/EP2011/006516, Written Opinion of International Search Authority.
International Application No. PCT/EP2011/006514, Written Opinion of International Search Authority.
International Application No. PCT/EP2011/006518, Written Opinion of International Search Authority.
International Application No. PCT/EP2011/006522, Written Opinion of International Search Authority.
International Application No. PCT/EP2011/006522, International Report on Patentability.
International Application No. PCT/EP2011/006515, International Preliminary Report on Patentability, Jan. 21, 2013.
International Application No. PCT/EP2011/006515, Written Opinion on Search Report.
U.S. Appl. No. 13/976,832, Notice of Allowance dated Oct. 8, 2014, A593, 61 pages.
U.S. Appl. No. 13/976,814, Notice of Allowance dated Oct. 21, 2014, A581, 72 pages.
U.S. Appl. No. 13/976,804, Final Office Action dated Oct. 24, 2014, A585, pp. 18.
U.S. Appl. No. 13/977,159, Final Office Action dated Oct. 10, 2014, A605, 53 pages.
U.S. Appl. No. 13/977,156, Final Office Action dated Dec. 5, 2014, A617, 13 pages.
U.S. Appl. No. 13/976,779, Notice of Allowance dated Oct. 21, 2014, A601, 34 pages.
U.S. Appl. No. 13/976,814, Notice of Allowance Dated Dec. 29, 2014, A581, 10 pages.

* cited by examiner

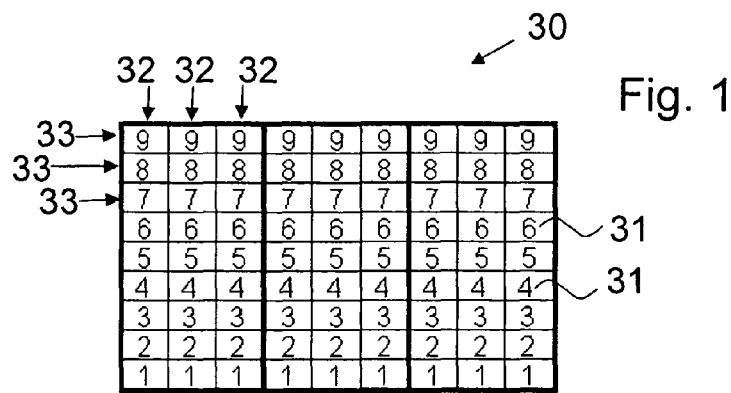
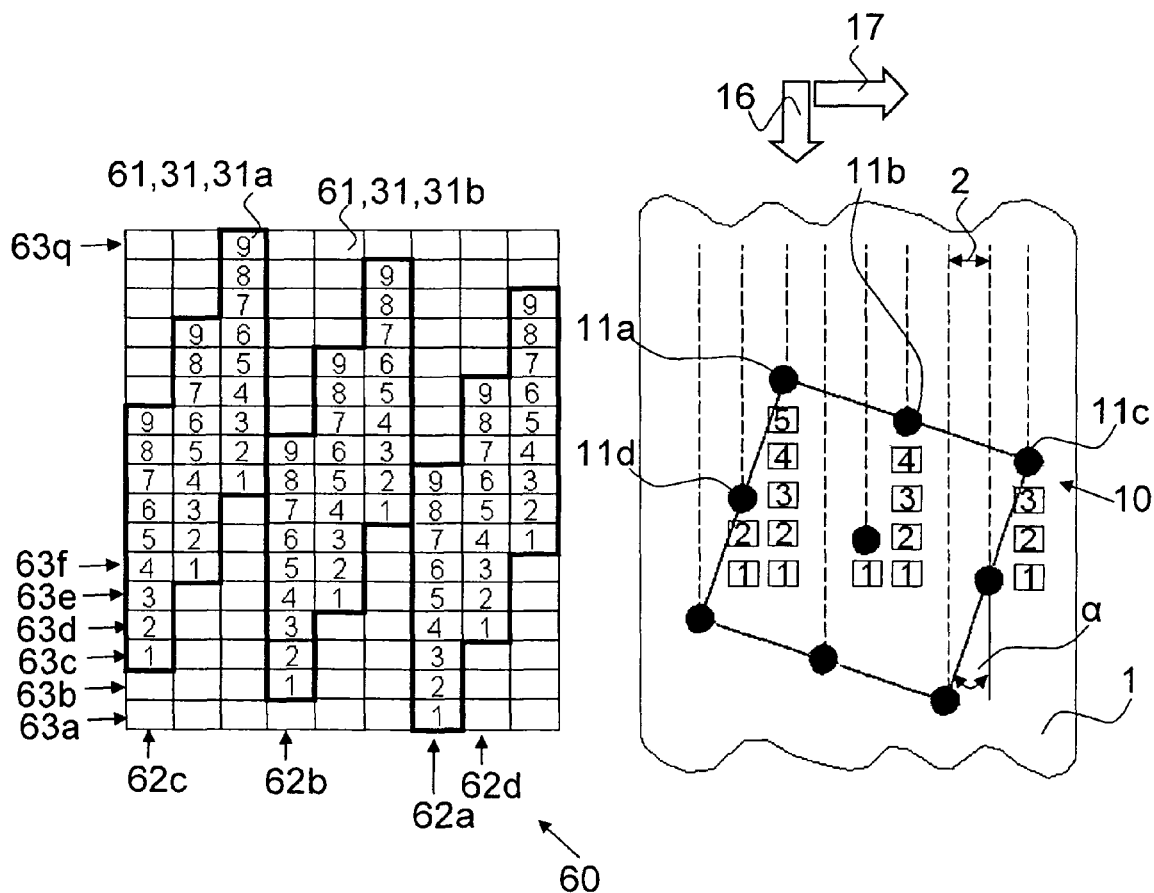
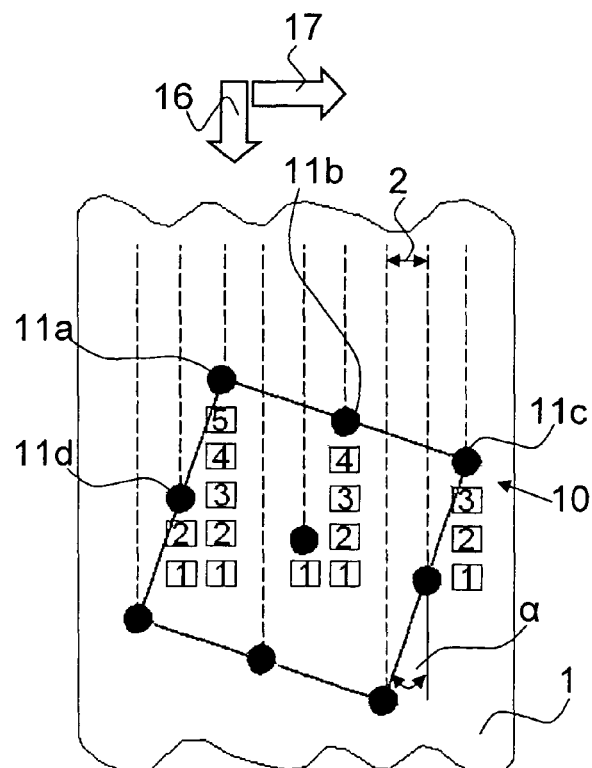

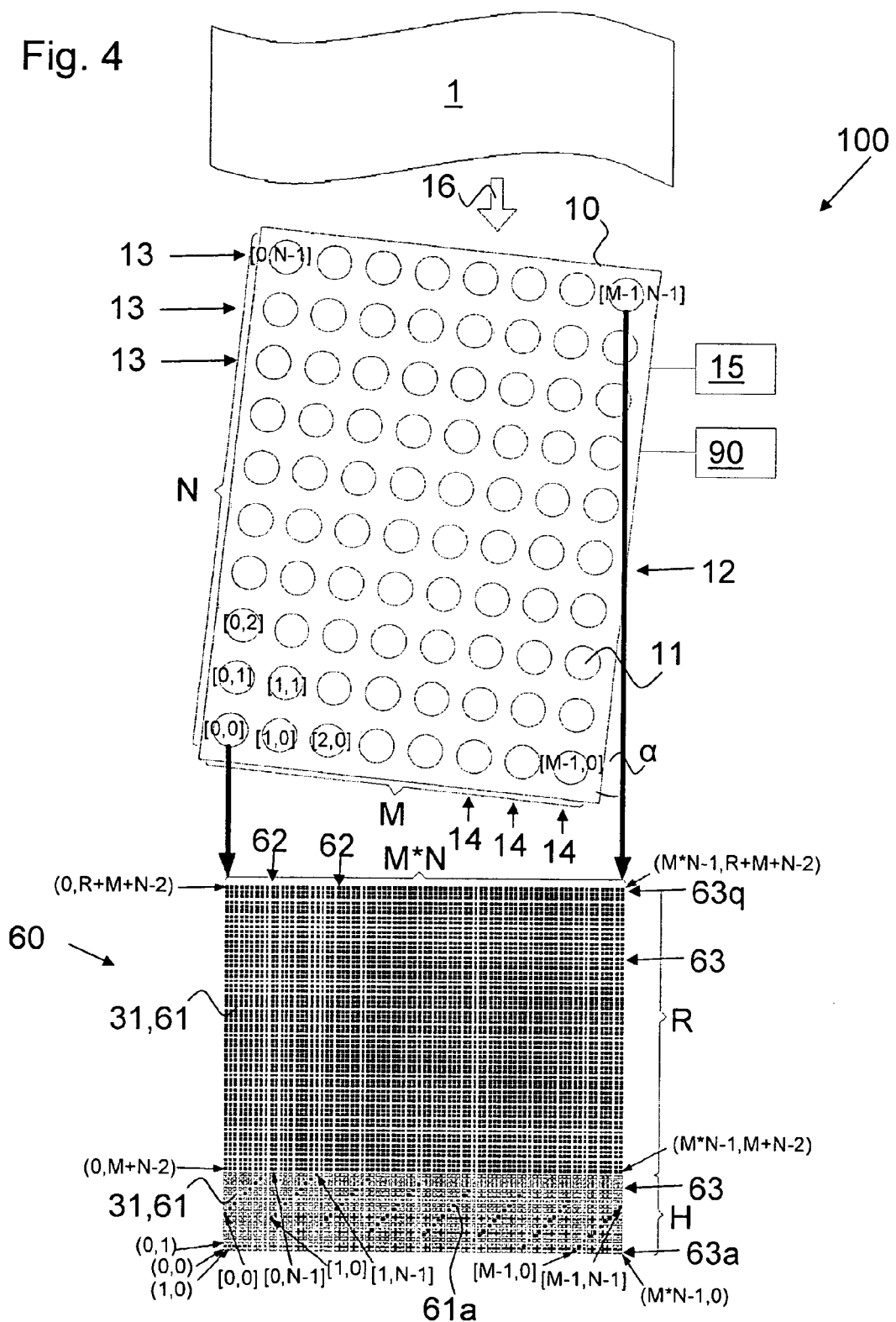

APPARATUS FOR PRINTING A DIGITAL IMAGE ON AN OBJECT, APPARATUS FOR SCANNING AN OBJECT TO CREATE A DIGITAL IMAGE, AND RELATED METHODS OF CONTROLLING SUCH APPARATUSES

FIELD OF THE INVENTION

The present invention relates in a first aspect to a method for controlling an apparatus, in particular a marking apparatus and/or a scanning apparatus, for printing a digital image on an object and/or for scanning an object to create a digital image of the object.

In a second aspect, the invention relates to an apparatus, in particular a marking apparatus and/or a scanning apparatus, for printing a digital image on an object and/or for scanning an object to create a digital image of the object.

Furthermore, the invention relates to a computer program and a computer program product with program code means for carrying out controlling steps of the described method, when the computer program is executed on a computer.

RELATED ART

In a generic method, the digital image comprises pixels arranged in image columns and image rows, the apparatus comprises an operating head having a plurality of operating devices, in particular marking devices and/or sensing devices, and the object is moved relative to the operating head in an advance direction. Furthermore, the pixel values are transferred between the operating devices and an image storage comprising storing elements arranged in storage columns and storage rows for storing the pixel values, wherein the operating devices are in particular time dependently supplied with pixel values of the digital image from the image storage, and/or pixel values sensed by the operating devices are transferred to the image storage to form the digital image.

A conventional apparatus for printing and/or scanning comprises an operating head having a plurality of operating devices, in particular marking devices and/or sensing devices, a driving mechanism for providing a relative movement of the object relative to the operating head in an advance direction, an image storage comprising storing elements arranged in storage columns and storage rows for storing pixel values, wherein the digital image comprises pixels arranged in image columns and image rows, and a control unit for transferring the pixel values between the operating devices and the image storage, particularly wherein the control unit is adapted to supply the operating devices time dependently with pixel values of the digital image from the image storage, and/or pixel values sensed by the operating devices are transferred to the image storage to form the digital image.

There is a general demand for a high resolution in printing and scanning. Hitherto the resolution has been enhanced by arranging the operating devices as close together as possible. However, there is an upper limit for this approach due to the size of the operating devices.

SUMMARY OF THE INVENTION

It is an object of the invention to create an apparatus for printing and/or scanning and to provide a method for controlling the apparatus that allow for a particularly high resolution with cost-effective means.

This objective is solved with a method and an apparatus as described herein.

Preferred embodiments are given in the dependent claims as well as in the following description, in particular in connection with the attached figures.

The method of the above mentioned kind is, according to the invention, characterized in that the operating devices are arranged in an array of array rows and array columns, such that a rectangular pattern of the operating devices is formed, the array of operating devices is tilted by a tilting angle with regard to the advance direction, and the operating devices are controlled according to a mapping algorithm that defines between which operating device and which storing element of the image storage a pixel value is transferred based on the tilting angle.

According to the invention, the device of the above mentioned kind is characterized in that the operating devices are arranged in an array of array rows and array columns, such that a rectangular pattern of the operating devices is formed, the array of operating devices is tilted by a tilting angle with regard to the advance direction, and the control unit is adapted to control the operating devices according to a mapping algorithm that defines between which operating device and which storing element of the image storage a pixel value is transferred based on the tilting angle.

It can be regarded as an idea of the invention to use a rectangular array of operating devices in a tilted position. That means neither the rows nor the columns of the array are parallel to the advance direction. In this way, all operating devices may be displaced to another in a direction perpendicular to the advance direction. A resolution in this direction can thus be increased.

Operating devices of different rows may be controlled simultaneously, i.e. are activated to print pixels of the digital image or sense areas of the object. The invention may be based on the finding that the relative position between the object and the operating head depends on the tilting angle. It can thus be seen as an idea of the invention to control the operating devices according to a mapping algorithm that takes into account the tilting angle. In other words, provision may be made to simultaneously print and/or sense pixels of different rows of the digital image, wherein the pixels are determined based on the tilting angle.

In the case that the operating devices perform marking operations, the mapping algorithm controls which pixel value of the digital image is supplied to which operating device such that a printed image, i.e. the digital image printed onto the object, is not distorted, blurred or unintentionally rotated. If the operating devices perform sensing operations, the mapping algorithm controls a transfer or reading out of pixel values measured by the operating devices to the image storage such that a digital image is obtained that is not distorted or blurred.

In a sense of the invention, the storage elements of the image storage are not physically arranged in storage columns and storage rows. The arrangement may rather be understood as identification information such that it is possible to assign a pixel value stored in a certain storage column and storage row to a specific image row and image column of the digital image.

The tilting angle is chosen such that the array is tilted to a degree in which the array rows extend in a transverse direction relative to the advance direction and the operating devices of a successive array row of the rectangular pattern are offset with regard to the operating devices of a preceding array row of the rectangular pattern in the direction perpendicular to the advance direction. In particular, the tilting angle can have a value between 1° and 10°.

As a consequence, the amount of offset of the operating devices of a successive array row with regard to the operating devices of a preceding array row is smaller than a pitch of the operating devices of one array row.

The tilting angle may be defined in the plane of the object's surface. The advance direction of the object may lie in this plane as well. In this case, the direction perpendicular to the advance direction may also lie in this plane.

To differentiate between the array columns and array rows, the array columns are understood as those lines of the array that deviate from the advance direction only by the tilting angle, whereas the array rows are almost perpendicular to the advance direction, i.e. they deviate from the direction perpendicular to the advance direction by the tilting angle.

During operation, there may be no motion of the operating head in the direction perpendicular to the advance direction required. Consequently, the maximum resolution for printing and/or sensing in the direction perpendicular to the advance direction may be defined by the number of operating devices that have a different position with regard to this direction.

The digital image may be understood as any image consisting of a plurality of picture elements, i.e. pixels. The digital image may either be transferred into the image storage from an outside system or may be generated by the control unit. The latter may in particular be advantageous if the digital image is an automatic generated serial number or a time and/or date stamp.

Each pixel of the digital image has a certain value, the pixel value. This may be any variable that can have at least two different values. These values may be true and false or black and white for apparatuses according to the invention that are binary marking apparatuses, such as needle printers, pad printers, single color ink printers, laser printers, thermal printers, water jet printers, or electrical discharge machines. More than two values are used for indicating e.g. a brightness of the pixel, such as in gray scale laser printing. A pixel value may also consist of a tuple of values, such as a tuple of three values for printing three dots of different colors. In this case, an operating device may comprise three marking elements for applying these three dots to the object. Common in computer graphics are pixel values that comprise three color-values, each of which can have 2^16 different values. If not stated otherwise, in the following the words pixel and pixel value will be used synonymously.

The operating devices may be marking and/or sensing devices. A sensing device may comprise a light-sensitive detector and the scanning movement may be the relative movement between the object and the operating head. A marking device may be any device suited to change the appearance of a surface of the object. To this end, the device may apply a dye such as ink onto the object or may apply energy such as laser light, heat or water jet to change the surface of the object. The surface of the object may comprise a special substrate such as a photosensitive layer or a thermal sensitive material. In the following, the words marking and printing are used synonymously.

If a pixel value is transferred to an operating device, this is to be understood as activating the respective operating device to apply a marking onto the object, the marking corresponding to the pixel value.

It may be provided that the transferred pixel values are instantly printed, or that the transferred pixel values are printed when a next transfer moment is reached, and other pixel values are then transferred to the operating devices.

It may be regarded as an idea of the invention to use arrays in which all operating devices are arranged in at least one rectangular pattern. Advantageously, standardized components can then be used.

It is also possible that several rectangular patterns are provided wherein each rectangular pattern prints one part of the digital image and/or senses one area of the object to produce one part of the digital image. In this case, the rectangular patterns are arranged next to each other, i.e. the patterns do not overlap.

In a preferred embodiment, the operating devices comprise marking devices that are arranged in a first array in a rectangular pattern and the operating devices comprise sensing devices that are arranged in a second array in a rectangular pattern, wherein the first array and the second array are spaced from each other.

According to a preferred embodiment of the invention, the tilting angle is chosen such that the operating devices, when activated, print and/or sense equally spaced lines and/or dots, the distance between the lines or dots being defined in a direction perpendicular to the advance direction, and each storage column of the image storage is assigned to one operating device. In other words: All pixel values transferred to or from one operating device are stored in one and the same storage column. Here, the pixel values of one column are successively transferred to the respective operating device. That means, the pixel values of one column are printed and/or recorded in a scanning operation one after another. If the operating devices perform marking operations, the tilting angle leads to the number of lines produced between the lines of two neighbouring operating devices of one array row being equal to the number of remaining array rows. In this way, a maximum resolution can be obtained.

If there are M operating devices in each array row and N operating devices in each array column, the total number of operating devices is M*N. The number of lines or dots spaced to each other in the direction perpendicular to the advance direction is then also M*N.

According to a preferred embodiment of the invention, the number of storage columns is at least M*N, in particular exactly equal to M*N. If a raw image to be printed has a number of columns exceeding M*N, it may be scaled down to M*N or a value smaller than M*N.

Another preferred embodiment of the invention is characterized in that the transfer of pixel values between the operating devices and the storing elements is carried out at transfer moments which are the same for all operating devices. Thus, there is one pixel clock, i.e. the inverse of the time span between successive transfer moments, that is used for all operating devices. A transfer moment may be understood as a point in time at which a pixel value is transferred between the image storage and an operating device. All operating devices are thus controlled in parallel, regardless of the respective position within the array. There is no timing difference between individual operating devices.

The product movement, i.e. the relative movement between the object and the operating head in the advance direction, may be measured once and then considered as constant over time. In this case, the frequency of the pixel clock is chosen constant.

The distance $D^v$ in the advance direction between two neighbouring object's dots being marked or sensed by one operating device is then $D^v=T*V$, where T is the time span between two successive transfer moments and V is the speed of the product movement.

The speed V may be measured by any suited external equipment, such as external shaft encoders or tachometers.

These devices are standard in the relevant industry. They provide an encoder pulse where each pulse corresponds to a specific known distance $D_c$ of product movement with a resolution that can be in the micrometer range.

The control unit can then determine the number $N_c$ of encoder pulses per pixel clock: $N_c = D^V/D_c$, where $D^V$ is the desired distance for printing and/or scanning.

The apparatus according to the invention may comprise a counter that issues one pixel pulse per every $N_c$ encoder pulses. A control unit may be adapted to perform a time interpolation if $N_c$ is non-integer.

The control unit may be further adapted to compensate for a changing speed V by adjusting the value of $N_c$ such that $D^V$ remains constant during operation, i.e. during printing and/or scanning.

The speed V may also be measured without external devices. To this end, according to a preferred embodiment of the invention, the operating head comprises at least one sensing device that is aligned with a marking device in the advance direction. For measuring the speed V, the marking device prints two markings onto the object with a time delay $T_d$ between the two markings. The sensing device then senses the markings on the object and the distance $D_d$ between the two markings is thus determined. The speed V can be calculated as $V = D_d/T_d$.

For increasing the resolution of printing and/or scanning, according to still another preferred embodiment of the invention, each of the pixel values transferred at one transfer moment between the image storage and the marking devices of one array row belongs to another image row of the digital image. That means, no operating device of the array is aligned with another operating device of the array in the advance direction.

However, there may be provided a first and a second array, wherein operating devices of the first array are aligned with operating devices of the second array in the advance direction. This may be advantageous, if operating devices of the first array are marking devices and operating devices of the second array are sensing devices.

For achieving a resolution in the advance direction that is equal to a resolution in a direction perpendicular to the advance direction, it may be provided that a time span between the transfer moments is chosen such that the time span corresponds to the distance in the advance direction between two neighbouring operating devices of one array row divided by the speed of the relative movement between the object and the operating head. In this equation, the distance between two neighbouring operating devices may also be replaced by the distance in the advance direction between areas on the object being printed on and/or sensed by the two neighbouring operating devices of one row.

This may be in particular valid if the pitch between operating devices in an array row is equal to the pitch between operating devices in an array column.

According to another embodiment of the invention, the number of storage rows of the image storage is chosen to exceed the number of image rows of the digital image by at least M+N−2, where M is the number of array columns of the array of operating devices and N is the number of array rows, in order to allow for a simple mapping algorithm. "Simple" may be understood such that computing power of a control unit required for carrying out the mapping algorithm is as low as possible. In one embodiment, the excess storage rows amount to $N^2 - 1$ or higher.

For a given size of the image storage, a maximum image size for digital images may thus be defined such that the image storage exceeds the maximum image size by the aforementioned amount. A raw image to be printed having a size larger than the maximum image size may then be down converted to the maximum image size.

According to a preferred embodiment of the invention, an image part of the image storage is reserved for the digital image and the remaining part of the image storage is a header that is not used for storing the digital image, and if the object is located such that a first number of operating devices is able to interact with the object, in particular to print on the object and/or sense the object, while a second number of operating devices is not able to interact with the object, pixel values are transferred between the first number of operating devices and the part of the image storage reserved for the digital image, and pixel values are transferred between the second number of operating devices and the header of the image storage.

If the operating devices are marking devices for applying or printing markings on the object, the header may comprise pixel values that cause no markings on the object when printed by the operating devices.

Preferably, the header may have a number of rows equal to the number of storage rows by which the image storage exceeds the number of image rows of the digital image.

When a next transfer moment is reached, it may be provided that pixel values are transferred between the operating devices and those storage rows that immediately follow the storage rows of pixel values transferred at the immediate prior transfer moment.

At one transfer moment it may occur that one operating device has already printed its last pixel value while another operating device still has to print a number of pixel values. If the digital image to be printed is stored in the image storage without distortion, this means that a pixel value of a certain storage column and the last storage row has just been transferred while for other storage columns the last storage row has not been reached yet. However, each operating device, including an operating device that has completed printing its respective image column, is to be supplied with a pixel value.

It is therefore provided that, according to a preferred embodiment of the invention, if a pixel value of a certain storage column and the last storage row of the image storage has been transferred at one transfer moment, a pixel value of the same storage column and the first storage row of the image storage is transferred at the next transfer moment.

Jumping from the last row of the image storage to the first row of the image storage results in a change between transferring a pixel value of the digital image or a pixel value of the header. Hence, an operating device having succeeded in printing an image column is supplied with pixel values of the header which do no lead to any further markings being printed on the object.

Alternatively, according to another preferred embodiment of the inventive method, pixel values are transferred between the operating devices and only one row of the image storage at a time. To this end, the digital image has to be distorted in the image storage. It is therefore provided that, in the image storage, the image columns of the digital image are shifted to each other by a number of image rows such that pixel values of only one storage row are transferred between the image storage and all operating devices at one transfer moment.

This number of image rows for shifting is such that there may be no distortion of the digital image when printed onto the object.

As with the header, the remaining pixels of the image storage, that means those pixels that are not loaded with the digital image, correspond to a fixed value that causes no marking on the object when supplied to an operating device.

If the operating devices comprise sensing devices, the transfer between the sensing devices and one row of the image storage leads at first to a distorted image in the image storage. This is subsequently corrected by shifting the image columns of the digital image to each other as described.

According to a preferred embodiment of the invention, the number of storage columns is chosen larger than the number of image columns to allow for a compensation of a horizontal offset of the object, and the image columns are shifted within the image storage by an offset number of storage columns corresponding to the horizontal offset. For a given number of storage columns, say, N*M, this may mean to define a maximum number of image columns, wherein the maximum number is smaller than N*M. If a raw image to be printed has a number of image columns exceeding the maximum number, it may be shrunk to form a digital image with a number of image columns equal to the maximum number.

The horizontal offset may in particular be determined with sensing devices of an operating head comprising both sensing and marking devices.

It may be preferred that the offset number of storage columns is updated at a plurality of transfer moments, in particular at each transfer moment.

An inventive computer program comprises program code means for carrying out controlling steps of a method when the computer program is executed on a computer, in particular on a control unit, the computer being operatively connected to the operating head.

A computer program product of the invention comprises program code means which are stored on a computer-readable data carrier in order to carry out controlling steps of a method when the computer program is executed on a computer, in particular on a control unit, the computer being operatively connected to the operating head.

The controlling steps may in particular comprise the steps of controlling the operating devices, in particular controlling the transfer of pixel values with the mapping algorithm and/or the steps relating to the measures for obtaining an undistorted image.

BRIEF DESCRIPTION OF THE DRAWINGS

The invention is described in greater detail below by reference to preferred embodiments which are illustrated in the attached drawings in which show:

FIG. 1 a schematic diagram of a digital image to be printed;

FIG. 2 a schematic diagram of an image storage of an apparatus according to the invention;

FIG. 3 a schematic representation of an operating head of an inventive apparatus;

FIG. 4 a schematic representation of an operating head of another inventive apparatus.

Figure 5:
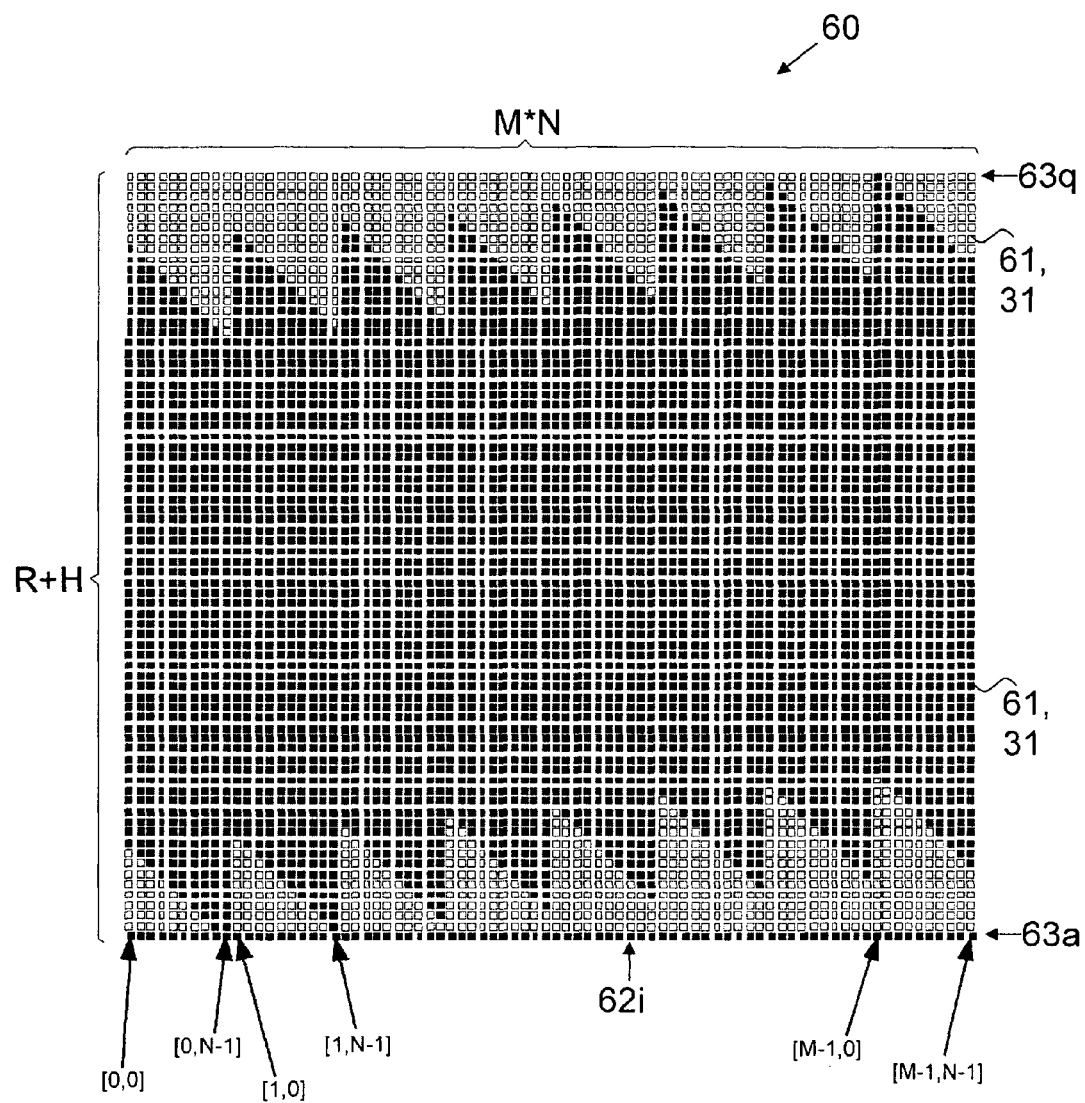
FIG. 5 a schematic diagram of an image storage loaded with pixels of a digital image.

Equivalent components are referred to in all figures with the same reference signs, respectively.

DETAILED DESCRIPTION OF THE INVENTION

FIG. 1 shows a schematic diagram of a digital image 30 to be printed. The digital image 30 consists of pixels 31 arranged in image columns 32 and image rows 33. Each pixel 31 has a certain pixel value 31. In the example shown, the pixels 31 of each image row 33 are graphically represented with numbers between one and nine. It is noted that a pixel is, however, a single dot or a plurality of single dots that are perceived as a single dot.

According to the method of the invention, this digital image 30 is firstly transferred to an image storage.

Such an image storage 60 is shown in FIG. 2. The image storage 60 comprises storing elements 61 wherein each storing element 61 may store one pixel value 31. The storage elements 61 are arranged in storage columns 62 and storage rows 63a to 63q. The image storage 60 may be formed by a conventional volatile printer memory, such as RAM or DDR-RAM. The storage elements are not physically arranged in the printer memory in storage columns and storage rows but rather assigned to a specific row and column.

The number of storage rows 63 exceeds the number of image rows 33. As a consequence, only some storing elements 61 are loaded with pixel values 31a of the digital image, while other storing elements 61 are loaded with pixel values 31b that result in no marking on an object when printed by an operating device.

The pixels 31 of the digital image are rearranged in the image storage 60 according to a mapping algorithm based on a tilting angle of an operating head.

This procedure will be explained with reference to the FIGS. 2 and 3.

FIG. 3 shows a schematic representation of an operating head 10 of an inventive apparatus. The operating head 10 comprises a plurality of operating devices 11a, 11b, 11c, 11d, which may be marking devices and/or sensing devices.

In the example shown, there are nine operating devices 11 forming an array of three array rows and three array columns perpendicular thereto.

Also shown in FIG. 3 is an object 1 to be printed on and/or to be scanned. The object 1 is moved relative to the operating head 11 in an advance direction 16.

The array columns are not arranged in parallel to the advance direction. The operating head 10 is rather tilted by a tilting angle a. As a consequence, not only the operating devices 11a, 11b, 11c of one array row, but also the operating devices 11a, 11d of one array column are arranged in a distance to each other in a direction 17 perpendicular to the advance direction 16. The tilting angle a is preferably chosen such that the resulting distances 2 between operating devices 11d, 11a that are neighbors in the direction 17 perpendicular to the advance direction 16 is the same for all pairs of neighbouring operating devices 11.

Due to the tilting, the operating devices 11a, 11b, 11c of one row are arranged spaced to each other in the advance direction 16. Thus, the object 1 reaches the operating devices 11a, 11b, 11c one after another.

To avoid a distorted printing or scanning, the mapping algorithm controls the operating devices in a specific way which will be described below with reference to FIGS. 2 and 3.

In the following, printing of a digital image 30 with the operating devices 11 will be explained. At a first point in time, i.e. a first transfer moment, the pixel values 31 of a first storage row 63a are transferred to the operating devices 11. In the example shown, the pixel value denoted with "1" of a first storage column 62a, that is a pixel value of a first image row, is transferred to a first operating device 11a. The other operating devices 11b, 11c, 11d are supplied with pixel values that cause no markings on the object.

After a time period corresponding to the frequency of a pixel clock, i.e. at a second transfer moment, the pixel values of a second storage row 63b are transferred to the operating devices 11. At this point in time, the object 1 has moved a step further in the advance direction 16. Now, the first operating device 11a prints a pixel value denoted with "2", that is a pixel value of the second image row. At the same time, a second operating device 11b prints a pixel value of the second storage column 62b denoted with "1", that is a pixel value of the first image row.

At each following transfer moment, pixel values of a successive storage row 63c to 63q are transferred to the operating devices 11.

In the example shown in FIG. 3, the first operating device 11a has already printed five pixels denoted with "1", "2", "3", "4", and "5", while the a fourth operating device 11d has only printed two pixels denoted with "1" and "2". This corresponds in FIG. 2 to the case that the first five storage rows 63a to 63e have been printed and, at the next transfer moment, the operating devices 11 will be controlled to print the pixel values 31 of the sixth storage row 63f. The printing process is concluded when the last storage row 63q has been printed with the operating devices.

FIG. 4 shows an apparatus 100 according to the invention for printing a digital image on an object 1 and/or scanning an object 1 to create a digital image of the object 1.

The apparatus 100 comprises an operating head 10 with operating devices 11, a driving mechanism 15 for moving the object 1 relative to the operating head 10 in the advance direction 16, and a control unit 90 for controlling the operating devices 11.

The operating devices 11 are arranged in N array rows 13 and M array columns 14. They are labelled in a matrix notation with numbers from "0" to "N−1" and "0" to "M−1", respectively, in squared brackets. The notation [0,2], for instance, stands for the operating device 11 of the first array column and the third array row.

In total, there are N*M operating devices 11. Hence, the same number of image columns can be printed or created by scanning.

FIG. 4 also shows an image storage 60 that comprises storing elements 61 arranged in storage column 62 and storage rows 63. A number R of the storage rows 63 are reserved for storing a digital image. The remaining storage rows 63, that means a number of H storage rows 63, constitute an empty header.

In the example shown, the image storage 60 stores a digital image to be printed. The pixel values 31 of the digital image are shown as filled black squares of the R storage rows 63 in FIG. 4. The digital image is loaded to align with the last storage row 63q. That means, the first storage row is loaded at a storage row corresponding to the number of the last storage row minus R−1, where R is the number of image rows.

In the example shown, the operating devices 11 are marking devices 11 for printing on the object 1. In this case, storage elements 61 of the H storage rows 63 of the header are loaded with pixel values that do not lead to any markings when transferred to the operating devices 11.

During operation, the object 1 approaches the operating head 10. As soon as the object 1 has reached a position in which a first operating device 11 is able to print onto the object 1, transfer of pixel values 31 from the image storage 60 to all operating devices 11 begins.

At such a first transfer moment, pixel values 61a, shown in black and arranged in diagonal lines in FIG. 4, are transferred to the operating devices 11.

FIG. 4 schematically shows to which operating device 11 the pixel values of the storing elements 61a are transferred. As mentioned, the respective operating devices 11 are labelled with squared brackets. The pixel values 31 of the image storage 60, in contrast, are labelled in a matrix form with numbers in parenthesis, that means round brackets.

At the first transfer moment, all but one of the pixel values that are transferred to the operating devices 11 belong to the header. The one exception is the storage element 61 indicated with [0, N−1]. This storage element 61 stores a pixel value 31 of the digital image. Its pixel value is transferred to the first operating device 11 being reached by the object 1, i.e. the operating device 11 denoted with [0, N−1].

In the example shown, the selection which pixel values are transferred to the operating devices 11 at the first transfer moment is described with the example formula:

$$[i,k] = (i*N+k, M-1-i+k),$$

where i and k are integers with values from 0 to M−1 and from 0 to N−1, respectively.

This formula means, for instance, that the storing device 11 denoted with [M−1,0] is supplied with the pixel value of the storage element ({M−1}*N, 0).

In general, it may be preferred to use the general formula:

$$[i,k] = (i*N+k, M-1-i+k*N) \text{ instead.}$$

At the next transfer moment (not shown in FIG. 4) another selection of pixel values will be transferred to the operating devices 11.

This selection differs from the previous one in that now pixel values of those storage rows 63 are transferred that immediately follow the storage rows 63 of the pixel values being transferred before. That means, the second part of the round brackets in the above formulas, which indicate the storage rows 63, is increased by 1. If the last storage row 63q is reached, transfer continues at the first storage row 63a.

That can be described by replacing the integer k at the last position of the example formula with k→(k+1) mod N. "mod" stands for the operation "modulus" and yields in the above expression the remainder of the operation (k+1)/N.

The whole picture may be printed after R+H steps. The header may be preferably chosen to have at least M+N−2 rows.

This control mechanism may be understood as part of the mapping algorithm.

Another control mechanism will be described with reference to FIG. 5. Here, an image storage 60 with storage elements 61 is depicted. The storage elements 61 that are loaded with pixel values 31 of a digital image to be printed are shown as filled squares. If not stated otherwise, the remarks to the above embodiment apply as well.

In contrast to the example shown in FIG. 4, at each transfer moment all pixel values 31 of one certain storage row 63 are transferred to the storage devices. That means, at a first transfer moment the pixel values 31 of the first storage row 63a are transferred to the operating devices. At a next transfer moment, the pixel values 31 of a next storage row 63, that means the second storage row 63b, are transferred. This is repeated until the pixel values of last storage row 63q have been printed.

To avoid printing of a distorted image, the pixel values 31 of the digital image have to be initially rearranged, as shown in FIG. 5.

This may be achieved by shifting the pixels of each storage column 62i by a number of j(i) storage rows, where i is an integer with values from 0 to M*N−1.

In the example shown, the storage columns 62i are shifted by j(i) storage rows, where:

$$j(i) = N + \{i \text{ div } N\} - \{i \text{ mod } N\} - 1.$$

Instead, the general formula $$j(i) = N^2 + \{i \text{ div } N\} - N*\{ \{i \text{ mod } N\}+1\}$$

may be used well.

The shifting may be performed in the image storage or prior to loading the digital image into the image storage.

The transfer of pixel values to the operating devices may be expressed by:

$$[i,k]=(i*N+k, 0).$$

At each following transfer moment, the integer k on the right side of the above equation is increased by one. This may be expressed by: k→(k+1) mod N. The control mechanism ends after R+H transfer moments.

The controlling steps described above with reference to printing also apply to scanning, when their order is reversed. That means, inter alia, all operating devices capture environmental parameters, such as brightness, at the same time. At a transfer moment, these captured parameters are transferred to the image storage to be stored as pixel values. In this step, the control unit controls the transfer according to the mapping algorithm such that a digital image can be created which finally shows the scanned object without distortion.

The invention may advantageously provide a way of printing and/or scanning with a particularly high resolution that is determined by all of the operating devices of the respective array. The operating devices can be controlled simultaneously with the control unit, resulting in increased operating speed, e.g. allowing higher speeds of the product movement. The mapping algorithm may advantageously compensate for the tilting of the operation head such that a digital image to be printed is not printed in a distorted or rotated way, and a digital image to be recorded of the object is recorded free of distortion.

The invention claimed is:

1. A method comprising:
controlling an apparatus, which is a scanning apparatus, for scanning an object to create a digital image of the object,
wherein the digital image comprises pixels arranged in image columns and image rows,
wherein the apparatus comprises an operating head having a plurality of operating devices, which are sensing devices,
wherein the object is moved relative to the operating head in an advance direction,
in which the pixel values are transferred between the operating devices and an image storage comprising storing elements arranged in storage columns and storage rows for storing pixel values,
wherein the operating devices are arranged in an array of array rows and array columns, such that a rectangular pattern of the operating devices is formed,
wherein the array of operating devices is tilted by a tilting angle with regard to the advance direction to increase a sensing resolution,
wherein
the operating devices are controlled according to a mapping algorithm that defines between which operating device and which storing element of the image storage a pixel value is transferred based on the tilting angle,
the number of storage columns is chosen larger than the number of image columns to allow for a compensation of a horizontal offset of the object, and
the image columns are shifted within the image storage by an offset number of storage columns corresponding to the horizontal offset.

2. The method of claim 1, wherein
the tilting angle is chosen such that the operating devices, when activated, sense equally spaced lines and/or dots, the distance between the lines or dots being defined in a direction perpendicular to the advance direction, and each storage column of the image storage is assigned to one operating device.

3. The method of claim 1, wherein
the transfer of pixel values between the operating devices and the storing elements is carried out at transfer moments which are the same for all operating devices.

4. The method of claim 3, wherein each of the pixel values transferred at one transfer moment between the image storage and the marking devices of one array row belongs to another image row of the digital image.

5. The method of claim 3, wherein
for achieving a resolution in the advance direction that is equal to a resolution in a direction perpendicular to the advance direction,
a time span between the transfer moments at which pixel values are transferred between the operating devices and the storing elements is chosen such that the time span corresponds to the distance in the advance direction between two neighboring operating devices of one array row divided by the speed of the relative movement between the object and the operating head.

6. The method of claim 3, wherein
when a next transfer moment is reached, pixel values are transferred between the operating devices and storage rows that immediately follow the storage rows of pixel values transferred at the immediate prior transfer moment.

7. The method of claim 3, wherein
if a pixel value of a certain storage column and the last storage row of the image storage has been transferred at one transfer moment, a pixel value of the same storage column and the first storage row of the image storage is transferred at the next transfer moment.

8. The method of claim 3, wherein
in the image storage, the image columns of the digital image are shifted to each other by a number of image rows such that pixel values of only one storage row are transferred between the image storage and all operating devices at one transfer moment.

9. The method of claim 8, wherein
the offset number is updated at a plurality of transfer moments.

10. The method of claim 1, wherein
the number of storage rows of the image storage is chosen to exceed the number of image rows of the digital image by at least M+N−2, where M is the number of array columns of the array of operating devices and N is the number of array rows of the array, in order to allow for a simple mapping algorithm.

11. The method of claim 1, wherein
an image part of the image storage is reserved for the digital image and the remaining part of the image storage is a header that is not used for storing the digital image, and
if the object is located such that a first number of operating devices is able to interact with the object by sensing the object, while a second number of operating devices is not able to interact with the object,
pixel values are transferred between the first number of operating devices and the part of the image storage reserved for the digital image, and
pixel values are transferred between the second number of operating devices and the header of the image storage.

12. A method comprising:
controlling an apparatus, which is a marking apparatus for printing a digital image on an object, wherein the digital image comprises pixels arranged in image columns and image rows, wherein the apparatus comprises an operating head having a plurality of operating devices, which are marking devices, wherein the object is moved relative to the operating head in an advance direction, in which the pixel values are transferred between the operating devices and an image storage comprising storing elements arranged in storage columns and storage rows for storing pixels values, wherein the operating devices are arranged in an array of array rows and array columns, such that a rectangular pattern of the operating devices is formed, wherein the array of operating devices is tilted by a tilting angle with regard to the advance direction to increase a printing resolution, wherein
the operating devices are controlled according to a mapping algorithm that defines between which operating device and which storing element of the image storage a pixel value is transferred based on the tilting angle,
the number of storage columns is chosen larger than the number of image columns to allow for a compensation of a horizontal offset of the object, and
the image columns are shifted within the image storage by an offset number of storage columns corresponding to the horizontal offset.

13. An apparatus which is a scanning apparatus, for scanning an object to create a digital image of the object, wherein the digital image comprises pixels arranged in image columns and image rows, the apparatus comprising:

an operating head having a plurality of operating devices which are sensing devices, a driving mechanism for providing a relative movement of the object relative to the operating head in an advance direction, an image storage comprising storing elements arranged in storage columns and storage rows for storing pixel values, a control unit for transferring the pixel values between the operating devices and the image storage, wherein,
the operating devices are arranged in an array of array rows and array columns, such that a rectangular pattern of the operating devices is formed, and
the array of operating devices is tilted by a tilting angle with regard to the advance direction to increase a sensing resolution, wherein,
the control unit is adapted to control the operating devices according to a mapping algorithm that defines between which operating device and which storing element of the image storage a pixel value is transferred based on the tilting angle,
the number of storage columns is chosen larger than the number of image columns to allow for a compensation of a horizontal offset of the object, and
the image columns are shifted within the image storage by an offset number of storage columns corresponding to the horizontal offset.

14. A computer program with program code stored on a non-transitory computer readable medium, the computer program for carrying out controlling steps of the method of claim 1 when the computer program is executed on a computer, the computer being operatively connected to the operating head.

15. A computer program product with program code which are stored on a non-transitory computer-readable medium in order to carry out controlling steps of the method of claim 1 when the computer program is executed on a computer, the computer being operatively connected to the operating head.

* * * * *